US010160317B2

(12) United States Patent
Yamashita et al.

(10) Patent No.: US 10,160,317 B2
(45) Date of Patent: Dec. 25, 2018

(54) VEHICLE SPEED CONTROL APPARATUS AND VEHICLE SPEED LIMITING APPARATUS

(71) Applicant: TOYOTA JIDOSHA KABUSHIKI KAISHA, Toyota-shi, Aichi-ken (JP)

(72) Inventors: Keiji Yamashita, Seto (JP); Takashi Inoue, Kasugai (JP); Tetsuya Taira, Nisshin (JP); Takato Masuda, Toyota (JP); Nobuyuki Tomatsu, Toyota (JP); Sokfan Yee, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 203 days.

(21) Appl. No.: 15/133,516

(22) Filed: Apr. 20, 2016

(65) Prior Publication Data
US 2016/0347175 A1 Dec. 1, 2016

(30) Foreign Application Priority Data
May 29, 2015 (JP) ................. 2015-110694

(51) Int. Cl.
*B60W 30/14* (2006.01)
*B60W 30/18* (2012.01)
*B60K 31/00* (2006.01)

(52) U.S. Cl.
CPC .......... *B60K 31/00* (2013.01); *B60K 31/0008* (2013.01); *B60W 30/146* (2013.01); *B60W 30/18163* (2013.01); *B60K 2031/0033* (2013.01); *B60K 2031/0091* (2013.01); *B60W 2520/10* (2013.01); *B60W 2520/28* (2013.01); *B60W 2540/10* (2013.01); *B60W 2550/22* (2013.01); *B60W 2550/402* (2013.01)

(58) Field of Classification Search
None
See application file for complete search history.

(56) References Cited

U.S. PATENT DOCUMENTS 9,609,046 B2 * 3/2017 Fowe ................. H04L 67/10
9,731,719 B2 * 8/2017 Niino ................. B60W 30/16
(Continued)

FOREIGN PATENT DOCUMENTS

EP 2 514 652 A1 10/2012
ES 2 245 558 A1 1/2006
(Continued)

Primary Examiner — Navid Ziaeianmehdizadeh
(74) Attorney, Agent, or Firm — Oliff PLC

(57) ABSTRACT

A vehicle's accelerator pedal depression amount is detected; a speed limit of a road on which the vehicle is traveling is determined; a start of a lane change is estimated; an upper-limit speed is determined each time when the speed limit changes; and the travelling speed is controlled to not exceed the upper-limit speed even if the accelerator pedal depression amount increases to cause the speed of the vehicle to exceed the upper-limit speed. The speed of the vehicle is controlled, until a predetermined timing, to not exceed the upper-limit speed determined before the start of a lane change is estimated, if (i) the start of a lane change is estimated, and (ii) a reduction in the speed limit is determined. After the predetermined timing, the speed of the vehicle is controlled to not exceed the currently determined upper-limit speed.

8 Claims, 5 Drawing Sheets

(56) References Cited

U.S. PATENT DOCUMENTS

| | | | |
|---|---|---|---|
| 2003/0163239 A1* | 8/2003 | Winner | B60K 31/0008 701/93 |
| 2008/0270001 A1 | 10/2008 | Seto et al. | |
| 2009/0195411 A1* | 8/2009 | Ichihashi | G08G 1/096716 340/905 |
| 2012/0078484 A1* | 3/2012 | Kato | B60W 30/143 701/96 |
| 2013/0054106 A1* | 2/2013 | Schmudderich | B60W 30/0956 701/96 |
| 2013/0085655 A1* | 4/2013 | Kii | B60K 31/18 701/103 |
| 2013/0085976 A1* | 4/2013 | Bone | B60W 30/18163 706/46 |
| 2014/0121933 A1* | 5/2014 | Slaton | B60W 50/085 701/93 |
| 2014/0195093 A1* | 7/2014 | Litkouhi | B62D 15/0255 701/23 |
| 2015/0149037 A1* | 5/2015 | Lim | B60W 30/09 701/41 |
| 2015/0194055 A1* | 7/2015 | Maass | B60W 50/14 340/905 |
| 2015/0353087 A1* | 12/2015 | Niino | B60W 30/16 701/96 |
| 2016/0114811 A1* | 4/2016 | Matsuno | B60W 50/0225 701/23 |
| 2016/0121893 A1* | 5/2016 | Ask | B60W 30/16 701/96 |
| 2016/0272204 A1* | 9/2016 | Takahashi | B60W 30/143 |
| 2016/0339913 A1* | 11/2016 | Yamashita | B60W 30/146 |
| 2016/0347312 A1* | 12/2016 | Tomatsu | B60W 30/146 |
| 2017/0101096 A1* | 4/2017 | Kim | B60W 30/16 |
| 2017/0313311 A1* | 11/2017 | Niino | B60W 30/146 |
| 2017/0341652 A1* | 11/2017 | Sugawara | B60W 30/18163 |

FOREIGN PATENT DOCUMENTS

| | | |
|---|---|---|
| JP | H07-132785 A | 5/1995 |
| JP | 2006-168593 A | 6/2006 |
| JP | 2008-162553 A | 7/2008 |
| JP | 2008-265706 A | 11/2008 |
| JP | 2008-298547 A | 12/2008 |
| JP | 2016-215917 A | 12/2016 |

* cited by examiner

VEHICLE SPEED CONTROL APPARATUS AND VEHICLE SPEED LIMITING APPARATUS

The present application is based on and claims the benefit of priority of Japanese Priority Application No. 2015-110694, filed on May 29, 2015, the entire contents of which are hereby incorporated herein by reference.

BACKGROUND

1. Technical Field

The present disclosure relates to a vehicle speed control apparatus and a vehicle speed limiting apparatus.

2. Description of the Related Art

Acquisition of the speed limit of a place where a vehicle is traveling, and limiting of the vehicle speed to be less than or equal to the acquired speed limit has been discussed in the related art (for example, see Japanese Laid-Open Patent Application No. 2006-168593).

SUMMARY

According to one aspect, a vehicle speed control apparatus includes at least one processor configured to determine an upper-limit speed of a vehicle each time a speed limit of a road on which the vehicle is traveling changes; and control a speed of the vehicle in such a manner as to not exceed the upper-limit speed even if the vehicle's accelerator pedal depression amount would increase the speed of the vehicle over the upper-limit speed. The at least one processor is configured to control, until a predetermined timing, the speed of the vehicle to not exceed the upper-limit speed, the upper-limit speed being determined before the start of the vehicle's lane change is estimated, if (i) the start of the vehicle's lane change is estimated, and (ii) a reduction in the speed limit is determined, and to control, after the predetermined timing, the speed of the vehicle to not exceed the currently determined upper-limit speed.

Other objects, features and advantages will become more apparent from the following detailed description when read in conjunction with the accompanying drawings.

DETAILED DESCRIPTION OF EMBODIMENTS

For the purpose of convenience, the description of the above-mentioned related art will be continued first.

In the related art, if the speed limit of the road where the vehicle is travelling changes, the vehicle speed is automatically limited to the new speed limit without regard to whether the vehicle is carrying out a lane change. If the speed limit of the road is reduced just at a time of carrying out a lane change, the vehicle may automatically decelerate even though the driver does not wish to decelerate the vehicle because of carrying out a lane change.

Therefore, an object of embodiments is to provide a vehicle speed control apparatus and a vehicle speed limiting apparatus, including the vehicle speed control apparatus, whereby it is possible to reduce a likelihood of deceleration of a vehicle which may otherwise occur against the driver's intention.

Embodiments will now be described with reference to the drawings.

Figure 1A:
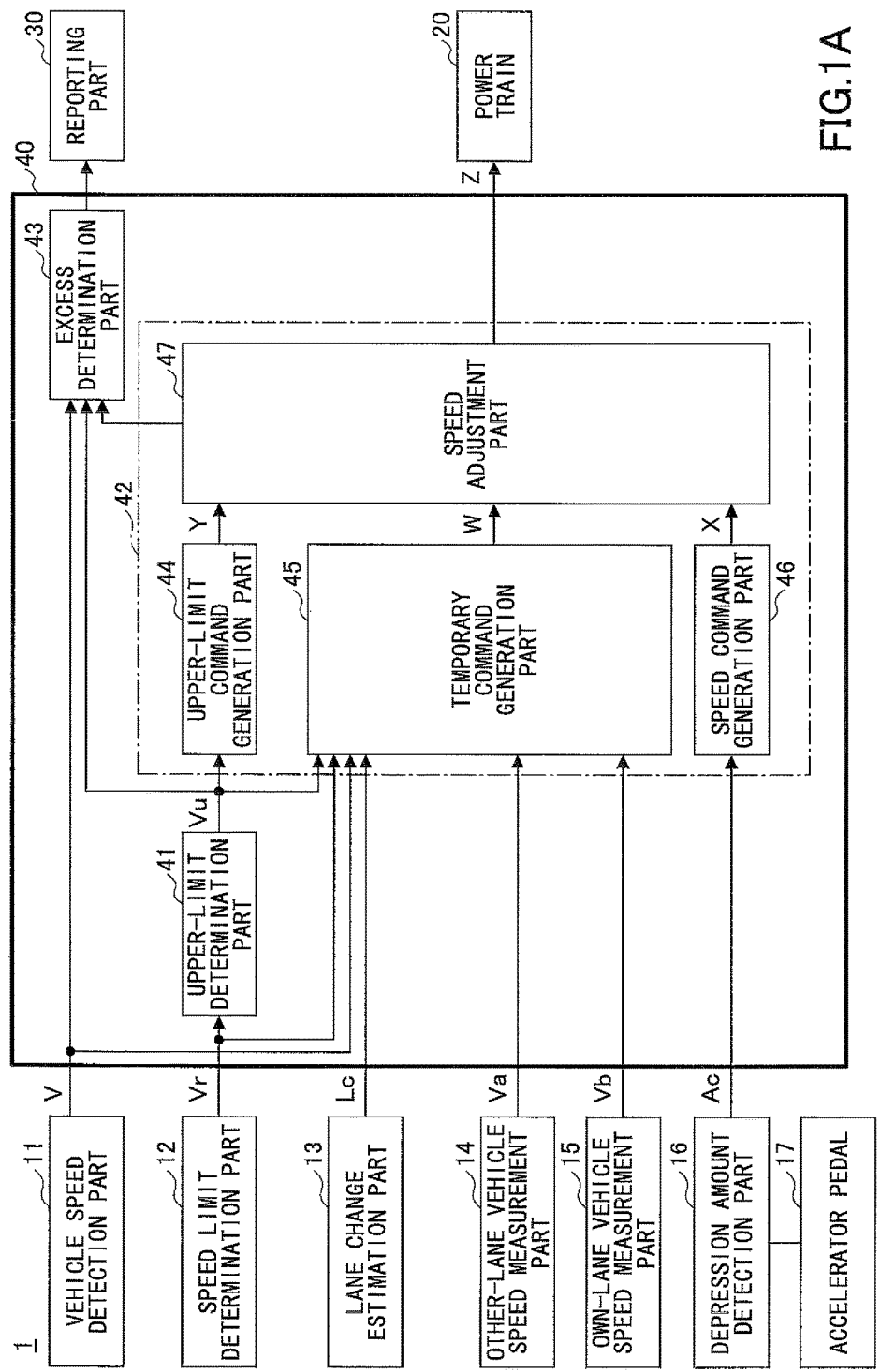
FIG. 1A is a block diagram illustrating an example of a configuration of a vehicle speed limiting apparatus including a vehicle speed control apparatus.

FIG. 1A is a block diagram illustrating an example of a configuration of a vehicle speed limiting apparatus 1 including a vehicle speed control apparatus 40. The vehicle speed limiting apparatus 1 is an example of an apparatus that limits a vehicle speed within an upper-limit speed determined depending on the speed limit of a road. The vehicle speed limiting apparatus 1 is an on-vehicle apparatus installed in a vehicle. The vehicle speed limiting apparatus 1 includes, for example, a vehicle speed detection part 11, a speed limit determination part 12, a lane change estimation part 13, an other-lane vehicle speed measurement part 14, an own-lane vehicle speed measurement part 15, an accelerator pedal 17, a depression amount detection part 16, the vehicle speed control apparatus 40, a power train 20, and a reporting part 30.

The vehicle speed detection part 11 is an example of a sensor detecting a vehicle speed V. Specific examples of a vehicle speed detection part 11 may include, for example, a wheel speed sensor, which detects the vehicle speed V by monitoring the rotation of the wheel(s).

The speed limit determination part 12 is an example of a device that determined the speed limit Vr of the road on which the vehicle is travelling. The speed limit determination part 12 includes, for example, a camera that takes an image in the front of the vehicle, and an image recognition part that carries out an image recognition process to acquire a road sign or the speed limit Vr indicated on the road sign from the image taken by the camera. Alternatively, the speed limit determination part 12 can be, for example, a memory that stores the respective speed limits Vr of roads, and an extraction part that extracts the speed limit Vr of the road where the vehicle currently is, from the memory (e.g., a car navigation device having a route searching function, or the like).

The speed limit determination part 12 may determine the speed limit for each lane of a road, for example, where the speed limit Vr of the road is set for each lane included in the road. In this case, the speed limit determination part 12 include, for example, a memory that stores the speed limits Vr of the respective lanes included in the roads Vr, and an extraction part that extracts the speed limit Vr of the lane of the road in which the vehicle is present from the memory. Therefore, for example, in FIG. 2, the speed limit determination part 12 is capable of determining the speed limit Vr of the lane of the road 70 in which the vehicle 61 is currently traveling (i.e., the lane 71 before a lane change is started, or the lane 72 after the lane change is finished). Also, the speed limit determination part 12 is capable of determining the speed limit Vr of the lane 72 to which the vehicle 61 is to move through the lane change before the lane change is finished.

Returning to FIG. 1A, the lane change estimation part 13 is an example of a device that estimates whether the vehicle will start a lane change, and to estimate whether the vehicle has finished the lane change. The lane change estimation part 13 outputs an estimation signal Lc having an active level during an estimation period (hereinafter, referred to as an "estimation period of time Ta") starting from when it estimates that the vehicle will start a lane change until when it estimates that the vehicle has finished the lane change. The lane change estimation part 13 outputs the estimation signal Lc having a high level during the estimation period of time Ta, and outputs the estimation signal Lc having a low level during a period of time (hereinafter, referred to as an "other-than estimation period of time Tb") other than the estimation period of time Ta, for example. The lane change estimation part 13 estimates whether the vehicle is changing into the left or right lane. The lane change estimation part 13 has a function of estimating whether the vehicle will start a lane change in front of another vehicle that is in the destination lane.

The lane change estimation part 13 estimates a start and an end of the lane change based on, for example, a change in a signal of the vehicle's direction indicator. In this case, when a change in the signal of the direction indicator from its turned off state to its turned on state is detected, the lane change estimation part 13 estimates that the vehicle will start a lane change. When the signal of the direction indicator is switched from its turned on state to its turned off state, the lane change estimation part 13 estimates that the vehicle has finished the lane change.

Alternatively, the lane change estimation part 13 may also estimate the start and the end of a lane change based on changes in the extent to which the width of the vehicle overlaps with the width of the lane in which the vehicle is traveling. In this case, the lane change estimation part 13 estimates that the vehicle will start a lane change when it detects that the extent of overlap falls below a predetermined value. The lane change estimation part 13 estimates that the vehicle has finished the lane change when it detects that the extent of overlap exceeds a predetermined value.

Alternatively, the lane change estimation part 13 may estimate the start and the end of a lane change based on changes in the number of lanes of the road on which the vehicle is traveling.

Figure 3:
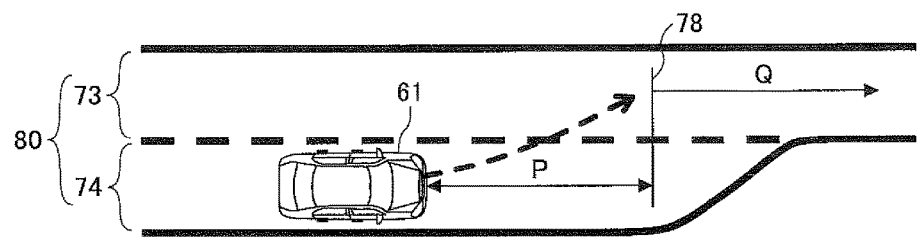
FIG. 3 illustrates an example of a case where a vehicle travels on a road where the number of lanes decreases.

In this case, for example, in FIG. 3, the lane change estimation part 13 estimates that the vehicle 61 will start a lane change when it detects that the travel time to elapse until the vehicle 61 reaches the reduced-number-of-lanes position 78 or the distance to the position becomes less than or equal to a predetermined threshold P. In fact, in such a case, the lane change estimation part 13 is capable of estimating a lane change of the vehicle 61 to the lane 73. The "reduced-number-of-lanes position" 78 means a position where the lane 74 ends due to the reduction in the number of lanes of the road 80 on which the vehicle 61 is currently traveling, and may include a position near the position where the lane 74 ends. The threshold P is determined to be any value greater than 0.

The lane change estimation part 13 estimates that the vehicle 61 has finished the lane change to the lane 73 when it detects that the travel time having elapsed after the vehicle 61 passed through the reduced-number-of-lanes position 78 or the travel distance therefrom becomes greater than or equal to a predetermined threshold Q. The threshold P is determined to be any value greater than or equal to 0.

Figure 4:
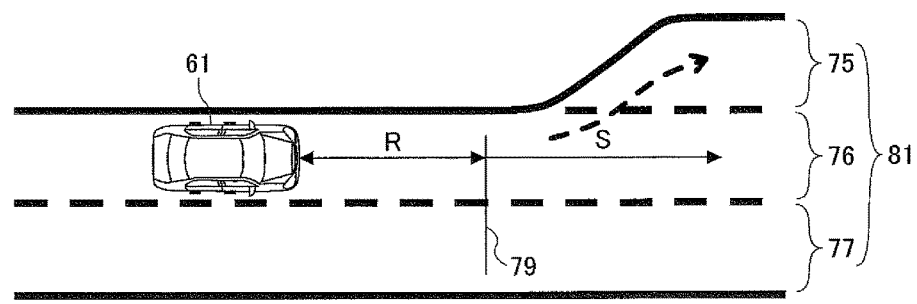
FIG. 4 illustrates an example of a case where a vehicle travels on a road where the number of lanes increases.

For example, in FIG. 4, the lane change estimation part 13 estimates that the vehicle 61 will start a lane change when it detects the signal from the direction indicator of the vehicle 61 suggesting a lane change to the lane 75 starting at the increased-number-of-lanes position 79, while the travel time to elapse until the vehicle 61 reaches the number-of-lane increase position 79 or the travel distance thereto is less than or equal to a predetermined threshold R. In fact, in such a case, the lane change estimation part 13 is capable of estimating a lane change of the vehicle 61 to the lane 75. The "increased-number-of-lanes position" 79 means a position where the lane 75 adjacent to the lane 76 in which the vehicle 61 is currently traveling starts due to the increase in the number of lanes of the road 81, and can include a position near the position where the lane 75 starts. The threshold R is determined to be any value greater than 0. The lane 75 is, for example, a passing lane having the same speed limit Vr as the lanes 76 and 77 or greater than the lanes 76 and 77, or a branch lane having the speed limit Vr that is the same as the lanes 76 and 77 or less than the lanes 76 and 77 (for example, a connection road at an interchange, or the like).

The lane change estimation part 13 estimates that the vehicle has finished the lane change when it detects that the travel time after the vehicle 61 passed through the increased-number-of-lanes position 79 or the travel distance therefrom becomes greater than or equal to a predetermined threshold S, and the signal of the direction indicator of the vehicle 61 is switched from its turned on state to its turned off state. The threshold S is determined to be any value greater than or equal to 0.

An actual method of estimating lane changes by the lane change estimation part 13 is not limited thereto, and any other method can be used. In order to avoid erroneous estimates of lane changes, any one of the above-mentioned methods can be combined. In order to avoid erroneous estimates of lane changes, estimation of a lane change can be carried out in such a manner as to additionally use at least one item of information of steering information, yaw rate information, image information taken by a camera, the vehicle position information, and so forth, in a combining manner.

Returning to FIG. 1A, the other-lane vehicle speed measurement part 14 is an example of such a sensor as to measure the vehicle speed Va of another vehicle that is travelling on a lane different from the lane in which the vehicle equipped with the vehicle speed limiting apparatus 1 is traveling. The own-lane vehicle speed measurement part 15 is an example of such a sensor that measures the vehicle speed Vb of another vehicle travelling in the same lane as the lane in which the vehicle is traveling. The other-lane vehicle speed measurement part 14 and the own-lane vehicle speed measurement part 15 are examples of a speed measuring part that measures the vehicle speed of another vehicle. For example, in FIG. 2, the other vehicle speed measurement part 14 is capable of measuring the vehicle speed Va of the other vehicle 62 travelling in the lane 72 adjacent to the lane 71 when the vehicle 61 is traveling in the lane 71. Also, the own vehicle speed measurement part 15 is capable of measuring the vehicle speed Vb of the other vehicle 62 travelling in the lane 72 when the vehicle 61 is travelling in the lane 72. Specific examples of these vehicle speed measurement parts 14 and 15 include sensors that emit electric waves towards another vehicle to measure the vehicle speed of the other vehicle, communication devices that receive the other vehicle's vehicle speed through vehicle-vehicle or road-vehicle radio communication, or the like.

Returning to FIG. 1A, the depression amount detection part 16 is an example of a sensor detecting the depression amount Ac of the accelerator pedal 17 depressed by the driver. The depression amount Ac of the accelerator pedal 17 is also called an "opening" Ac of the accelerator pedal 17 depressed by the driver.

The vehicle speed control apparatus 40 is an example of a device that carries out control to limit the vehicle speed (i.e., "vehicle speed limiting control") to not exceed an upper-limit speed determined according to the determined speed limit Vr of the road. The vehicle speed control apparatus 40 includes an upper-limit determination part 41, a vehicle speed control part 42, and an excess determination part 43. The vehicle speed control apparatus 40 is, for example, an electronic control unit (so-called, "ECU") that includes a microcomputer (as will be described later with reference to FIG. 1B) implementing the upper-limit determination part 41, the vehicle speed control part 42, and the excess determination part 43.

The upper-limit determination part 41 is an example of a device that determines the vehicle's upper-limit speed (hereinafter, referred to as an "upper-limit speed Vu") each time the speed limit Vr of the road determined by the speed limit determination part 12 changes. The upper-limit determination part 41 determines the upper-limit speed Vu to be such a value as to have a difference from the speed limit Vr less than a predetermined amount. In other words, the upper-limit speed Vu can be determined to be the same as the speed limit Vr, a value acquired from adding a predetermined difference to the speed limit Vr, a value acquired from subtracting a predetermined difference from the speed limit Vr, or the like. For example, if the determined speed limit Vr is 80 kph, the upper-limit determination part 41 can determine that the upper-limit speed Vu is 80 kph, 82 kph, 78 kph, or the like. Note that "kph" denotes "km/h".

The vehicle speed control part 42 is an example of a device that controls the vehicle speed V using the upper-limit speed Vu as the upper-limit (in other words, to not exceed the upper-limit speed Vu) even if the depression amount AC of the vehicle's accelerator pedal 17 would increase the vehicle speed V over the upper-limit speed Vu. The depression amount AC is detected by the depression amount detection part 16. The vehicle speed control part 42 includes a speed adjustment part 47 that outputs a control signal Z for adjusting the vehicle speed V.

The power train 20 is an example of a mechanism for transmitting, via a gearbox, the power of at least one of an engine and a motor to the wheels of the vehicle according to the control signal Z that is output from the speed adjustment part 47. The power train 20 includes, for example, at least one of the engine, the motor, and the gearbox. As a result of the power train 20 transmitting the power to the wheels according to the control signal Z, it is possible to accelerate or decelerate the vehicle.

The vehicle speed control part 42 carries out "deceleration limiting control" until a predetermined timing if the lane change estimation part 13 estimate that the vehicle will start a lane change, and the speed limit determination part 12 determines a reduction in the speed limit Vr. The "deceleration limiting control" means controlling the vehicle speed V using the upper-limit speed Vu as the upper-limit, the upper-limit speed Vu being determined by the upper-limit determination part 41 before the lane change estimation part 13 estimates that the vehicle will start a lane change. After the predetermined timing, the vehicle speed control part 42 controls the vehicle speed V using the upper-limit speed Vu as the upper-limit, the upper-limit speed Vu being currently determined by the upper-limit determination part 41. Thus, even if the speed limit Vr is decreased when the vehicle carries out the lane change, the vehicle speed V is not limited to the reduced speed limit Vr but is temporarily limited to the upper-limit speed Vu determined before the start of the lane change is estimated. Therefore, it is possible to reduce a likelihood of the vehicle automatically decelerating against the driver's intention. "Determining a reduction in the speed limit Vr" can mean "determining that the speed limit Vr will decrease", and also, can mean "determining that the speed limit Vr has been decreased".

Figure 1B:
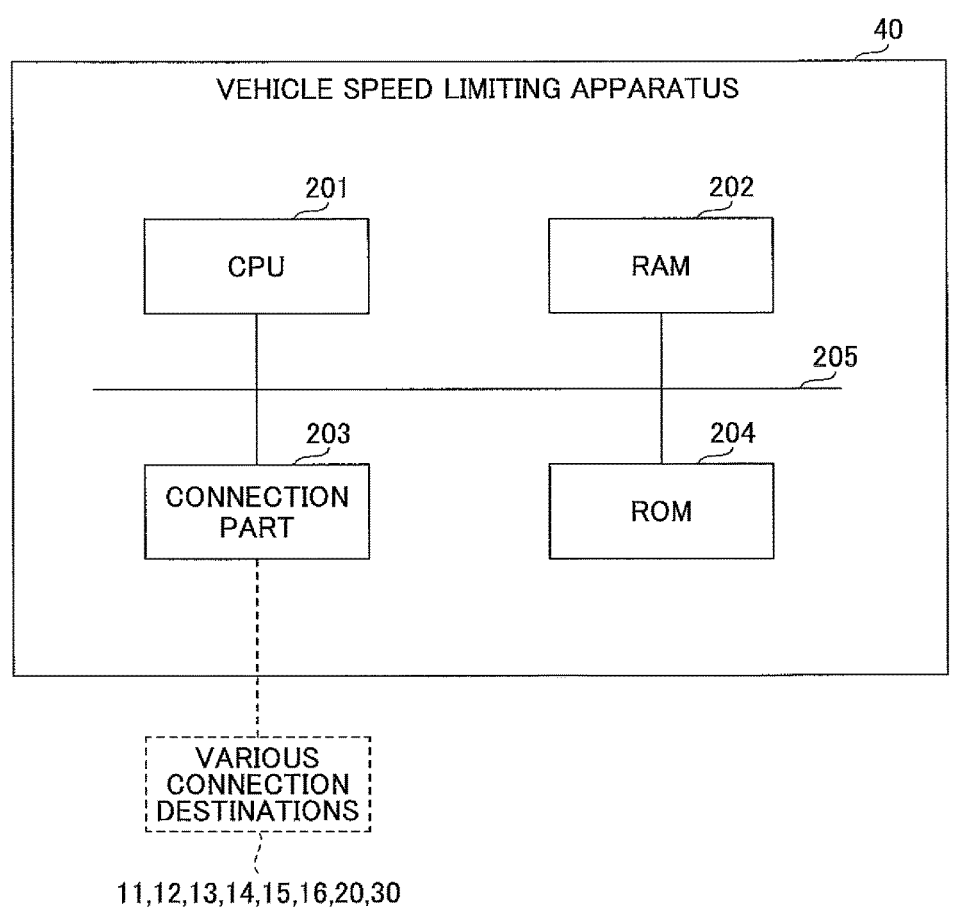
FIG. 1B illustrates one example hardware configuration of the vehicle speed control apparatus.

A hardware configuration of the vehicle speed control apparatus 40 will now be described. FIG. 1B illustrates an example of the hardware configuration of the vehicle speed control apparatus 40.

As shown in FIG. 1B, the vehicle speed control apparatus 40 includes a Central Processing Unit (CPU) 201, a Random Access Memory (RAM) 202, a connection part 203, and a Read-Only Memory (ROM) 204. Note that, these elements of the vehicle speed control apparatus 40 are mutually connected by a bus 205.

The CPU 201 executes a program stored by the ROM 204 to implement the upper-limit determination part 41, the vehicle speed control part 42, and the excess determination part 43 described above with reference to FIG. 1A.

The RAM 202 is a main storage such as a Dynamic Random Access Memory (DRAM), a Static Random Access Memory (SRAM), or the like. The RAM 202 provides a work area where the program stored by the ROM 204 is expanded to be executed by the CPU 201. Also, the RAM 202 provides a storage area to temporarily store information generated as a result of the execution by the CPU 201 of the program stored by the ROM 204.

The connection part 203 is an interface that is connected to various connection destinations such as the vehicle speed detection part 11, the speed limit determination part 12, the lane change estimation part 13, the other-lane vehicle speed measurement part 14, the own-lane vehicle speed measurement part 15, the depression amount detection part 16, the vehicle speed control apparatus 40, the power train 20, and the reporting part 30, and sends and receives various information items among these various connection destinations.

The ROM 204 is a main storage such as an Erasable Programmable ROM (EPROM), an Electrically Erasable Programmable ROM (EEPROM), or the like, and stores the program to be executed by the CPU 201, and information used when the CPU 201 executes the program.

Figure 2:
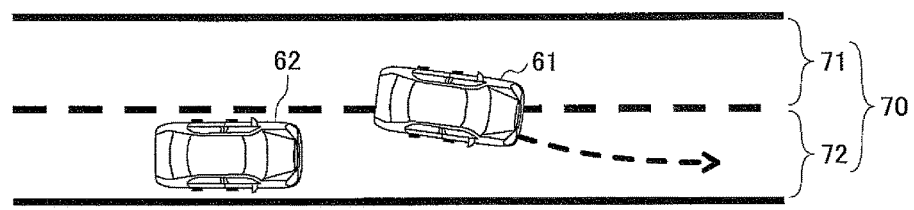
FIG. 2 illustrates an example of a case where a vehicle overtakes another vehicle.

In FIG. 2, it is assumed that the upper-limit speed Vu determined by the upper-limit determination part 41 before the lane change estimation part 13 estimates that the vehicle will start a lane change is 61 kph, for example. Also, it is assumed that, during the vehicle 61 carrying out a lane change while traveling at the vehicle speed V of 40 kph, the speed limit Vr is reduced from 60 kph, which is higher than the current vehicle speed V, to 50 kph, which is also higher than the current vehicle speed V. In this case, although the speed limit determination part 12 determines that the speed limit Vr is reduced from 60 kph to 50 kph during the vehicle 61 carrying out a lane change in a state of traveling at 40 kph, the vehicle speed control part 42 controls the vehicle speed V to not exceed 61 kph until a predetermined timing.

In other words, the vehicle speed V after the speed limit Vr is reduced is not limited to be less than or equal to the reduced speed limit Vr that is 50 kph, but limited to be less than or equal to the upper-limit speed Vu, that is, 61 kph, from before start of the lane change is estimated, until the predetermined timing. Therefore, for immediately and smoothly completing the lane change, the driver is allowed to accelerate the vehicle 61 from 40 kph to 61 kph, thus exceeding 50 kph, until the predetermined timing, by depressing the accelerator pedal 17.

Then, after the predetermined timing, the vehicle speed control part 42 controls the vehicle speed V using the upper-limit speed Vu (for example, 51 kph determined by the upper-limit determination part 41 according to the 50 kph that is the reduced speed limit Vr) as the upper-limit. Thereby, after the predetermined timing, the control is allowed to automatically return to such normal vehicle speed limiting control as to limit the vehicle speed V to not exceed the upper-limit speed Vu (in this example, 51 kph) currently determined according to the currently determined speed limit Vr (in this example, 50 kph).

Thus, it is possible to reduce a likelihood that the vehicle automatically decelerates to a speed (in this example, 50 kph) different from the driver's intention.

Also, for example, in FIG. 2, it is assumed that the upper-limit speed Vu determined by the upper-limit determination part 41 before the lane change estimation part 13 estimates that a lane change will start is 61 kph. However, now, it is assumed that, when the vehicle 61 changes lanes while traveling at the vehicle speed V of 40 kph, the speed limit Vr of the road is reduced from 60 kph, which is higher than the vehicle speed V, to 30 kph, which is lower than the vehicle speed V. In this case, although the speed limit determination part 12 determines that, when the vehicle 61 changes lanes while traveling at the vehicle speed V of 40 kph, the speed limit Vr is reduced from 60 kph to 30 kph, the vehicle speed control part 42 controls the vehicle speed V to not exceed 61 kph, until the predetermined timing.

In other words, the vehicle speed V after the speed limit Vr is reduced is not limited to be less than or equal to the reduced speed limit Vr, i.e., 30 kph, but limited to be less than or equal to the upper-limit speed Vu before the start of the lane change was estimated, i.e., 61 kph, until the predetermined timing. Therefore, as long as the driver depresses the accelerator pedal 17 with a constant depression amount, the driver can complete the lane change of the vehicle 61, in a state where the vehicle 61 does not automatically decelerate from 40 kph to 30 kph against the driver's intention and the vehicle speed V is maintained at 40 kph, until the predetermined timing.

Then, after the predetermined timing, the vehicle speed control part 42 controls the vehicle speed V using the upper-limit speed Vu (for example, 31 kph determined by the upper-limit determination part 41 according to 30 kph, which is the reduced speed limit Vr) as the upper-limit. Thus, after the predetermined timing, the control is allowed to automatically return to such normal vehicle speed limiting control as to limit the vehicle speed V to not exceed the upper-limit speed Vu (in this example, 31 kph) currently determined according to the currently determined speed limit Vr (in this example, 30 kph).

Thus, it is possible to reduce a likelihood that the vehicle automatically decelerates to a speed different from the driver's intention (in this example, 30 kph).

The vehicle speed control part 42 can carry out "deceleration limiting control" until a predetermined timing, if the lane change estimation part 13 estimates that the vehicle will start a lane change in front of another vehicle and the speed limit determination part 12 determines a reduction in the speed limit Vr. Note that "deceleration limiting control" means controlling the vehicle speed V using the upper-limit speed Vu as the upper-limit, the upper-limit speed Vu being determined by the upper-limit determination part 41 before the lane change estimation part 13 estimates that the vehicle will start a lane change. Thus, the vehicle speed V is not limited to be less than or equal to the reduced speed limit Vr. Therefore, it is possible to prevent the other vehicle following the vehicle from approaching the vehicle too much. After the predetermined timing, the vehicle speed control part 42 controls the vehicle speed V using the upper-limit speed Vu as the upper-limit. Here, the upper-limit speed Vu is one currently determined by the upper-limit determination part 41.

For example, in FIG. 2, the vehicle speed control part 42 carries out deceleration limiting control, until a predetermined timing, if the vehicle 61 is estimated to start a lane change in front of the other vehicle 62 and the speed limit Vr is determined as being reduced below the vehicle speed V. Thus, the vehicle speed control part 42 is capable of preventing the other vehicle 62 following the vehicle 61 from approaching the vehicle 61 too rapidly. In fact, if the vehicle 61 automatically decelerates to have a speed near the speed limit Vr as a result of the speed limit Vr being reduced below the vehicle speed V of the vehicle 61, the other vehicle 62 following the vehicle 61 may approach the vehicle 61 rapidly.

Also, for example, in FIG. 2, the vehicle speed control part 42 carries out deceleration limiting control, until a predetermined timing, if the vehicle 61 is estimated to start a lane change in front of the other vehicle 62 and the speed limit Vr is determined as being reduced to be lower than or equal to the vehicle speed Vc of the other vehicle 62. Thereby, the vehicle speed control part 42 is capable of preventing the other vehicle 62 following the vehicle 61 from approaching the vehicle 61 too much rapidly. In fact, if the vehicle 61 automatically decelerates to a speed near the speed limit Vr as a result of the speed limit Vr being reduced to be lower than or equal to the vehicle speed Vc of the other vehicle 62, the other vehicle 62 following the vehicle 61 may approach the vehicle 61 rapidly. The vehicle speed Vc of the other vehicle 62 can be measured by the other-lane vehicle speed measurement part 14 before the lane change, and can be measured by the own-lane vehicle speed measurement part 15 after the lane change.

The above-mentioned cases where the speed limit Vr is reduced are not limited to cases where the speed limit Vr of the entire road on which the vehicle is traveling is reduced. The above-mentioned cases where the speed limit Vr is reduced can be also cases where the vehicle changes lanes from a lane having a higher speed limit Vr to a lane having a lower speed limit Vr. In the same way, a case where the speed limit Vr is increased is not limited to cases where the speed limit Vr of the entire road on which the vehicle is traveling is increased. The cases where the speed limit Vr is increased can be also cases where the vehicle changes lanes from a lane having a lower speed limit Vr to a lane having a higher speed limit Vr.

Also, the lane change estimation part 13 estimates that the vehicle will start a lane change in front of another vehicle, if a "moving direction detection part" detects that the vehicle moves in front of another vehicle. The "moving direction detection part" is a device that detects whether the vehicle moves in front of another vehicle. The moving direction detection part is, for example, capable of detecting whether the vehicle moves in front of another vehicle, based on relationships between the relative position of the other vehicle with respect to the vehicle, the vehicle speed V detected by the vehicle speed detection part 11, and the vehicle speed Va of the other vehicle measured by the other-lane vehicle speed measurement part 14. The relative position of the other vehicle with respect to the vehicle can be determined using, for example, a camera, a radar, a vehicle-vehicle communications, or the like. Any other method can also be used to estimate whether the vehicle will start a lane change in front of another vehicle.

In FIG. 1A, the vehicle speed control part 42 includes, for example, a speed command generation part 46, an upper-limit command generation part 44, a temporary command generation part 45, and a speed adjustment part 47.

The speed command generation part 46 is an example of a device that generates a speed command value X to control the vehicle speed V, according to the depression amount Ac of the accelerator pedal 17 detected by the depression amount detection part 16.

The upper-limit command generation part 44 is an example of a device that generates a limit command value Y to control the vehicle speed V at the upper-limit speed Vu determined by the upper-limit determination part 41.

The temporary command generation part 45 is an example of a device that generates a temporary command value W to control the vehicle speed V at the upper-limit speed Vu (hereinafter, referred to as a "temporary upper-limit speed Vw") determined by the upper-limit determination part 41 before the lane change estimation part 13 estimates that the vehicle will start a lane change. The temporary upper-limit speed Vw denotes an upper-limit speed temporarily used at a time of a lane change instead of the upper-limit speed Vu. The temporary command value W denotes a limit command value used temporarily at a time of a lane change instead of the limit command value Y.

The speed adjustment part 47 outputs a control signal Z to adjust the vehicle speed V according to the speed command value X generated by the speed command generation part 46 or the limit command value Y generated by the upper-limit command generation part 44, whichever results in the lower vehicle speed V, during a period of time during which the lane change estimation part 13 does not estimate that the vehicle will carry out a lane change. The "period of time during which the lane change estimation part 13 does not estimate that the vehicle will carry out a lane change" denotes the above-mentioned other-than estimation period of time Tb, and, for example, a period of time during which the lane change estimation part 13 outputs the estimation signal Lc having the low level.

During a period of time during which the lane change estimation part 13 estimates that the vehicle will carry out a lane change, the speed adjustment part 47 outputs the control signal Z to adjust the vehicle speed V according to the speed command value X generated by the speed command generation part 46 or the temporary command value W generated by the upper-limit command generation part 44, whichever results in the lower vehicle speed V. The "period of time during which the lane change estimation part 13 estimates that the vehicle will carry out a lane change" denotes the above-mentioned estimation period of time Ta, and, for example, a period of time during which the lane change estimation part 13 outputs the estimation signal Lc having the high level.

For example, the speed adjustment part 47 outputs the control signal Z to adjust the vehicle speed V according to the speed command value X, if, in the other-than estimation period of time Tb or the estimation period of time Ta, the command value X or Y/W, whichever results in the lower vehicle speed V, is the speed command value X. It can be said that the state where command value X or Y/W, whichever results in the lower vehicle speed V, is the speed command value X is the state where the speed determined by the depression amount AC of the accelerator pedal 17 (hereinafter, referred to as an "accelerator depression amount corresponding speed Vo") is less than the upper-limit speed Vu or the temporary upper-limit speed Vw. Therefore, if the command value X or Y/W, whichever results in the lower vehicle speed V, is the speed command value X, the speed adjustment part 47 is allowed to adjust the vehicle speed V at the accelerator depression amount corresponding speed Vo by adjusting the vehicle speed V according to the speed command value X, in a speed zone below the upper-limit speed Vu, or the temporary upper-limit speed Vw, without being limited by the upper-limit speed Vu or the temporary upper-limit speed Vw.

In contrast, the speed adjustment part 47 outputs the control signal Z to adjust the vehicle speed V according to the limit command value Y, if, in the other-than estimation period of time Tb, the command value X or Y, whichever results in the lower vehicle speed V, is the limit command value Y. It can be said that the state where the command value that results in the lower vehicle speed V is the limit command value Y is the state where the accelerator depression amount corresponding speed Vo is greater than the upper-limit speed Vu. Therefore, the vehicle speed V is maintained at the upper-limit speed Vu as a result of the speed adjustment part 47 adjusting the vehicle speed V according to the limit command value Y, if, in the other-than estimation period of time Tb, the command value that results in the lower vehicle speed V is the limit command value Y.

The speed adjustment part 47 outputs the control signal Z to adjust the vehicle speed V according to the temporary command value W, if, in the estimation period of time Ta, the command value X or W, whichever results in the lower vehicle speed V, is the temporary command value W. It can be said that, the state where the command value that results in the lower vehicle speed V is the temporary command value W is the state where the accelerator depression amount corresponding speed Vo is greater than the temporary upper-limit speed Vw. Therefore, if, in the estimation period of time Ta, the command value that results in the lower vehicle speed V is the temporary command value W, the vehicle speed V is maintained at the temporary upper-limit speed Vw as a result of the speed adjustment part 47 adjusting the vehicle speed V according to the temporary command value W.

If, in the other-than estimation period of time Tb, either one of the speed command value X and the limit command value Y results in the same vehicle speed V, the speed adjustment part 47 outputs the control signal Z to adjust the vehicle speed V according to a predetermined one of the speed command value X and the limit command value Y. It can be said that the state where either one of the speed command value X and the limit command value Y results in the same vehicle speed V is the state where the accelerator depression amount corresponding speed Vo is coincident with the upper-limit speed Vu. Therefore, if, in the other-than estimation period of time Tb, either one of the speed command value X and the limit command value Y results in the same vehicle speed V, the vehicle speed V is maintained at the upper-limit speed Vu, as a result of the speed adjustment part 47 adjusting the vehicle speed according to a predetermined one of the speed command value X and the limit command value Y.

The speed adjustment part 47 outputs the control signal Z to adjust the vehicle speed V according to a predetermined one of the speed command value X and the temporary command value W, if, in the estimation period of time Ta, either one of the speed command value X and the temporary command value W results in the same vehicle speed V. It can be said that the state where either one of the speed command value X and the temporary command value W results in the same vehicle speed V is the state where the accelerator depression amount corresponding speed Vo is coincident with the temporary upper-limit speed Vw. Therefore, if, in the estimation period of time Ta, either one of the speed command value X and the temporary command value W results in the same vehicle speed V, the vehicle speed V is maintained at the temporary upper-limit speed Vw as a result of the speed adjustment part 47 adjusting the vehicle speed V according to the predetermined one of the speed command value X and the temporary command value W.

For example, the speed command value X is a value to control the vehicle speed V at a target speed Vt corresponding to the depression amount Ac. In this case, the speed adjustment part 47 compares the target speed Vt and the upper-limit speed Vu in the other-than estimation period of time Tb. Then, if the target speed Vt is below the upper-limit speed Vu, the speed adjustment part 47 adjusts the vehicle speed V according to the speed command value X. If the target speed Vt is greater than or equal to the upper-limit speed Vu, the speed adjustment part 47 adjusts the vehicle speed V according to the limit command value Y. In the estimation period of time Ta, the speed adjustment part 47 compares the target speed Vt and the temporary upper-limit speed Vw. Then, if the target speed Vt is below the temporary upper-limit speed Vw, the speed adjustment part 47 adjusts the vehicle speed V according to the speed command value X. If the target speed Vt is greater than or equal to the temporary upper-limit speed Vw, the speed adjustment part 47 adjusts the vehicle speed V according to the temporary command value W.

For example, the speed command value X can be a value indicating a target acceleration At to control the vehicle speed V; the limit command value Y can be a value indicating a limit acceleration Ar to control the vehicle speed V at the upper-limit speed Vu; and the temporary command value W can be a value indicating a temporary acceleration Aw to control the vehicle speed V at the temporary upper-limit speed Vw. In this case, the speed adjustment part 47 compares the target acceleration At and the limit acceleration Ar in the other-than estimation period of time Tb. Then, if the target acceleration At is below the limit acceleration Ar, the speed adjustment part 47 adjusts the vehicle speed V according to the speed command value X. If the target acceleration At is greater than or equal to the limit acceleration Ar, the speed adjustment part 47 adjusts the vehicle speed V according to the limit command value Y. In the estimation period of time Ta, the speed adjustment part 47 compares the target acceleration At and the temporary acceleration Aw. Then, if the target acceleration At is below the temporary acceleration Aw, the speed adjustment part 47 adjusts the vehicle speed V according to the speed command value X. If the target acceleration At is greater than or equal to the temporary acceleration Aw, the speed adjustment part 47 adjusts the vehicle speed V according to the temporary command value W. The target acceleration At, the limit acceleration Ar, and the temporary acceleration Aw are accelerations of the vehicle itself.

For example, the speed command value X can be a value indicating a target driving force Dt to control the vehicle speed V; the limit command value Y can be a value indicating a limit driving force Dr to control the vehicle speed V at the upper-limit speed Vu; and the temporary command value W can be a value indicating a temporary driving force Dw to control the vehicle speed V at the temporary upper-limit speed Vw. In this case, the speed adjustment part 47 compares the target driving force Dt and the limit driving force Dr in the other-than estimation period of time Tb. Then, if the target driving force Dt is below the limit driving force Dr, the speed adjustment part 47 adjusts the vehicle speed V according to the speed command value X. If the target driving force Dt is greater than or equal to the limit driving force Dr, the speed adjustment part 47 adjusts the vehicle speed V according to the limit command value Y. In the estimation period of time Ta, the speed adjustment part 47 compares the target driving force Dt and the temporary driving force Dw. Then, if the target driving force Dt is below the temporary driving force Dw, the speed adjustment part 47 adjusts the vehicle speed V according to the speed command value X. If the target driving force Dt is greater than or equal to the temporary driving force Dw, the speed adjustment part 47 adjusts the vehicle speed V according to the temporary command value W. The target driving force Dt, the limit driving force Dr, and the temporary driving force Dw are driving outputs of the driving source (for example, an engine, a motor, or the like) to drive the wheels of the vehicle.

For example, the speed command value X can be a value indicating a target throttle valve opening St to control the vehicle speed V; the limit command value Y can be a value indicating a limit throttle valve opening Sr to control the vehicle speed V at the upper-limit speed Vu; and the temporary command value W can be a value indicating a temporary throttle valve opening Sw to control the vehicle speed V at the temporary upper-limit speed Vw. In this case, the speed adjustment part 47 compares the target throttle valve opening St and the limit throttle valve opening Sr in the other-than estimation period of time Tb. Then, if the target throttle valve opening St is below the limit throttle valve opening Sr, the speed adjustment part 47 adjusts the vehicle speed V according to the speed command value X. If the target throttle valve opening St is greater than or equal to the limit throttle valve opening Sr, the speed adjustment part 47 adjusts the vehicle speed V according to the limit command value Y. In the estimation period of time Ta, the speed adjustment part 47 compares the target throttle valve opening St and the temporary throttle valve opening Sw. Then, if the target throttle valve opening St is below the temporary throttle valve opening Sw, the speed adjustment part 47 adjusts the vehicle speed V according to the speed command-value X. If the target throttle valve opening St is greater than or equal to the temporary throttle valve opening Sw, the speed adjustment part 47 adjusts the vehicle speed V according to the temporary command value W. The target throttle valve opening St, the limit throttle valve opening Sr, and the temporary throttle valve opening Sw are the openings of the throttle valve to adjust the intake air quantity of the engine of the vehicle.

For example, the speed command value X can be a value indicating a target engine speed Rt to control the vehicle speed V; the limit command value Y can be a value indicating a limit engine speed Rr to control the vehicle speed V at the upper-limit speed Vu; and the temporary command value W can be a value indicating a temporary engine speed Rw to control the vehicle speed V at the temporary upper-limit speed Vw. In this case, the speed adjustment part 47 compares the target engine speed Rt and the limit engine speed Rr in the other-than estimation period of time Tb. Then, if the target engine speed Rt is below the limit engine speed Rr, the speed adjustment part 47 adjusts the vehicle speed V according to the speed command value X. If the target engine speed Rt is greater than or equal to the limit engine speed Rr, the speed adjustment part 47 adjusts the vehicle speed V according to the limit command value Y. In the estimation period of time Ta, the speed adjustment part 47 compares the target engine speed Rt and the temporary engine speed Rw. Then, if the target engine speed Rt is below the temporary engine speed Rw, the speed adjustment part 47 adjusts the vehicle speed V according to the speed command value X. If the target engine speed Rt is greater than or equal to the temporary engine speed Rw, the speed adjustment part 47 adjusts the vehicle speed V according to the temporary command value W. The target engine speed Rt, the limit engine speed Rr, and the temporary engine speed Rw are the engine speeds of the vehicle.

In FIG. 1A, the speed adjustment part 47 of the vehicle speed control part 42 sends information indicating that a vehicle speed V temporarily exceeding the upper-limit speed Vu at a time of a lane change will be allowed, to the excess determination part 43. If information indicating allowance of the vehicle speed V to temporarily exceed the upper-limit speed Vu is received, the excess determination part 43 determines whether the current vehicle speed V actually exceeds the upper-limit speed Vu. When the excess determination part 43 determines that the vehicle speed V actually exceeds the upper-limit speed Vu, the excess determination part 43 reports the driver that the vehicle speed V exceeds the upper-limit speed Vu (that can be the speed limit Vr) through the reporting part 30. Thus, it is possible to report the driver that the upper-limit speed Vu or the speed limit Vr is exceeded. The reporting part 30 warns that the upper-limit speed Vu or the speed limit Vr is exceeded in such a manner as to cause the driver to be able to determine that the upper-limit speed Vu or the speed limit Vr is exceeded through, for example, at least one of an indication, a sound, a vibration, and so forth.

Figure 5:
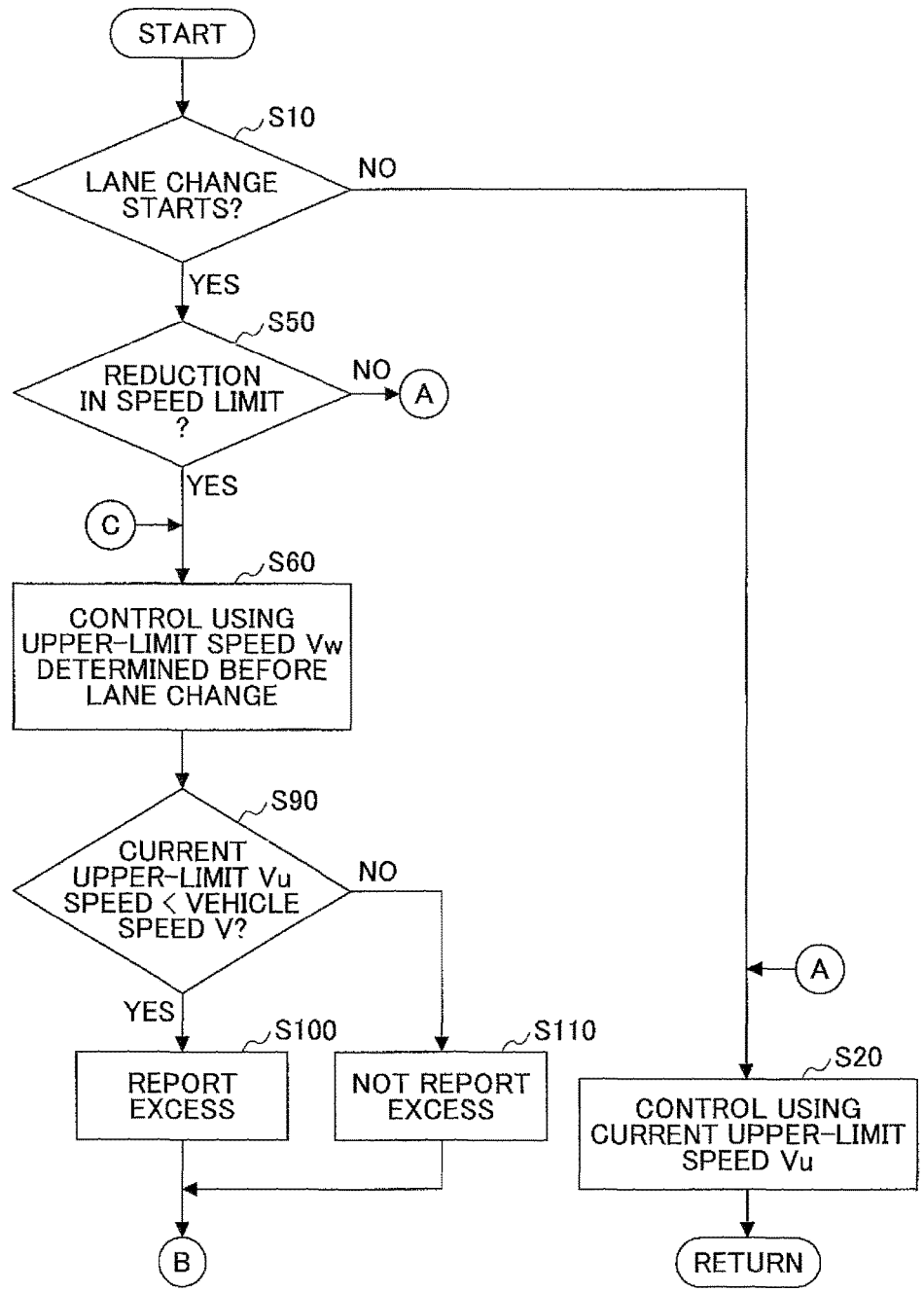
FIG. 5 is a flowchart illustrating an example of operations of the vehicle speed control apparatus.
Figure 6:
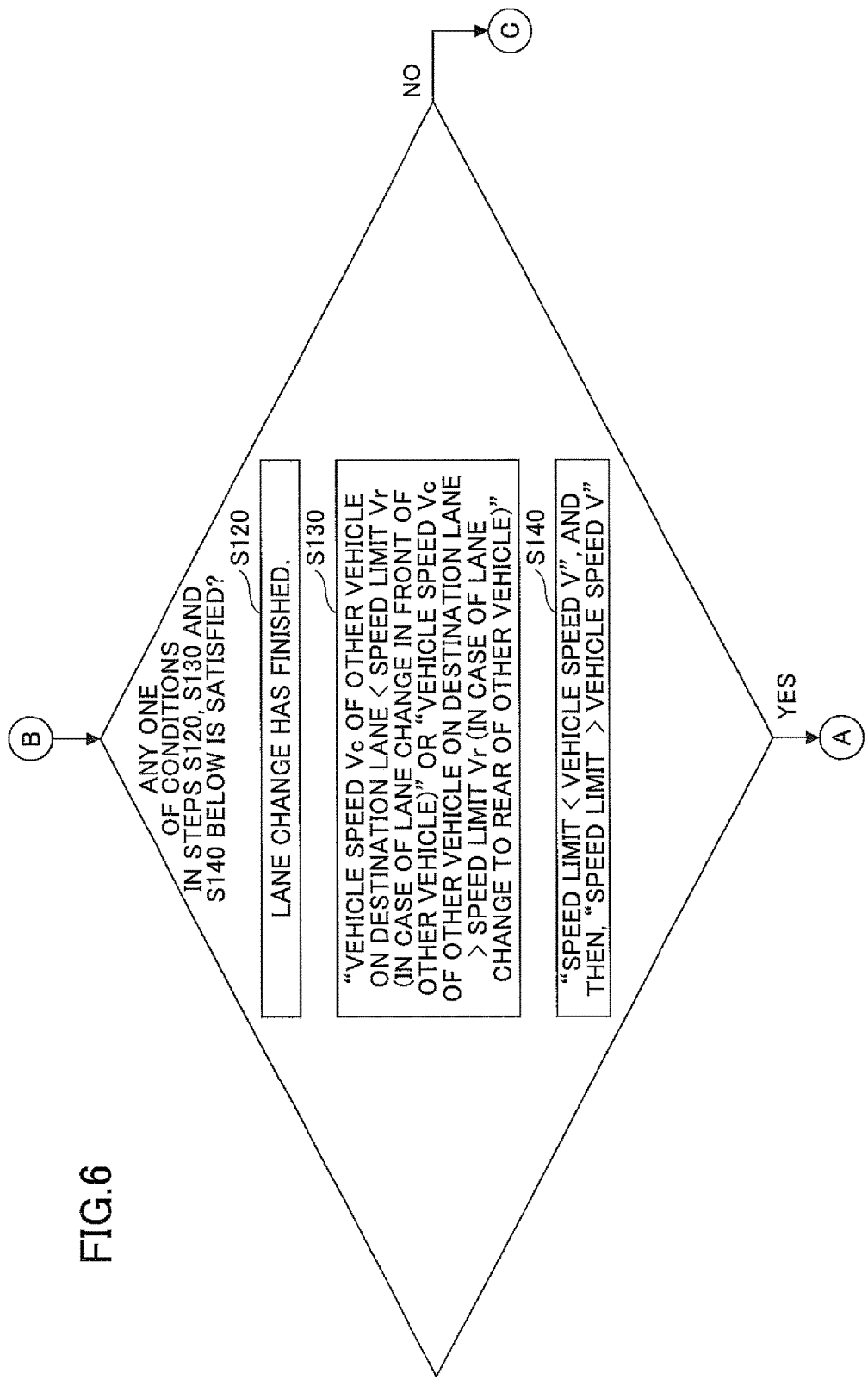
FIG. 6 is a flowchart illustrating an example of operations of the vehicle speed control apparatus.

FIG. 5 is a flowchart illustrating an example of operations of the vehicle speed control apparatus 40. The vehicle speed control apparatus 40 repeats a vehicle speed limiting method shown in the flowchart every predetermined cycle. FIG. 6 is an example of a flowchart to be executed subsequent to the flowchart of FIG. 5.

In step S10 of FIG. 5, the vehicle speed control part 42 determines whether the lane change estimation part 13 estimates that the vehicle will start a lane change.

When the vehicle speed control part 42 determines in step S10 that the lane change estimation part 13 does not estimate that the vehicle will start a lane change (NO), the vehicle speed control part 42 proceeds to step S20. The vehicle speed control part 42 controls, in step S20, the vehicle speed V in such a manner as to not exceed the upper-limit speed Vu even if the depression amount Ac of the accelerator pedal 17 would increase the vehicle speed V over the upper-limit speed Vu. After executing step S20, the vehicle speed control part 42 returns to step S10.

On the other hand, the vehicle speed control part 42 proceeds to step S50 when the vehicle speed control part 42 determines in step S10 that the lane change estimation part 13 estimates that the vehicle will start a lane change (YES).

In step S50, after the lane change estimation part 13 estimates that the vehicle will start a lane change, the vehicle speed control part 42 determines whether the speed limit determination part 12 determines a reduction in the speed limit Vr. If the speed limit determination part 12 does not determine in step S50 a reduction in the speed limit Vr (NO), the vehicle speed control part 42 controls the vehicle speed V to not exceed the upper-limit speed Vu (step S20). But, if the speed limit determination part 12 determines in step S50 a reduction in the speed limit Vr (YES), the vehicle speed control part 42 controls the vehicle speed V to not exceed the upper-limit speed determined before the lane change (that is, the temporary upper-limit speed Vw) (step S60).

In step S90, the excess determination part 43 determines whether the vehicle speed V exceeds the upper-limit speed Vu. If the vehicle speed V exceeds the upper-limit speed Vu, the excess determination part 43 reports the driver that the upper-limit speed Vu (that can be the speed limit Vr) is exceeded through the reporting part 30 (step S100). On the other hand, if the vehicle speed V does not exceed the upper-limit speed Vu, the excess determination part 43 does not report the driver that the upper-limit speed Vu and the speed limit Vr are exceeded (step S110). Note that steps S90, S100 and S110 can be skipped.

In this case, the vehicle speed control part 42 executes steps S120, S130 and S140 of FIG. 6, in parallel, after step S60.

If any one of the determination conditions of steps S120, S130 and S140 is satisfied (YES), the vehicle speed control part 42 determines that it becomes less necessary to control the vehicle speed V using the temporary upper-limit speed Vw as the upper-limit and it is a timing to stop controlling the vehicle speed V using the temporary upper-limit speed Vw as the upper-limit. Therefore, the vehicle speed control part 42 stops controlling the vehicle speed V using the temporary upper-limit speed Vw as the upper-limit, and proceeds to step S20.

In contrast, if none of the determination conditions of step S120, S130 and S140 is satisfied (NO), the vehicle speed control part 42 determines that it is still necessary to control the vehicle speed V using the temporary upper-limit speed Vw as the upper-limit, and it is not a timing to stop controlling the vehicle speed V using the temporary upper-limit speed Vw as the upper-limit. Therefore, the vehicle speed control part 42 continues controlling the vehicle speed V using the temporary upper-limit speed Vw as the upper-limit (step S60).

In step S120, the vehicle speed control part 42 determines whether the lane change estimation part 13 estimates that the vehicle has finished the lane change. When the vehicle speed control part 42 determines that the lane change estimation part 13 estimates that the vehicle has finished the lane change (NO), the vehicle speed control part 42 stops controlling the vehicle speed V using the temporary upper-limit speed Vw as the upper-limit, and controls the vehicle speed V to not exceed the upper-limit speed Vu (step S20).

In step S130, if the vehicle carries out the lane change in front of another vehicle, the vehicle speed control part 42 determines whether the speed limit Vr is less than or equal to the vehicle speed Vc of the other vehicle in the destination lane of the lane change. For example, in FIG. 2, if, as described above, the vehicle 61 carries out a lane change in front of the other vehicle 62, and the vehicle speed V of the vehicle 61 is decreased to around the speed limit Vr as a result of the speed limit Vr being reduced to be less than or equal to the vehicle speed Vo, a likelihood that the other vehicle 62 following the vehicle 61 rapidly approaches the vehicle 61 increases.

Therefore, when the vehicle speed control part 42 determines in step S130 that the speed limit Vr will become less than or equal to the vehicle speed Vc of another vehicle if the vehicle carries out the lane change in front of the other vehicle under the condition where none of steps S120 and S140 is satisfied (NO), the vehicle speed control part 42 continues controlling the vehicle speed V using the temporary upper-limit speed Vw as the upper-limit (step S60). On the other hand, when the vehicle speed control part 42 determines in step S130 that the speed limit Vr is greater than the vehicle speed Vc of another vehicle if the vehicle carries out the lane change in front of the other vehicle (YES), the vehicle speed control part 42 stops controlling the vehicle speed V using the temporary upper-limit speed Vw as the upper-limit, and controls the vehicle speed V to not exceed the upper-limit speed Vu (step S20).

When the vehicle speed control part 42 determines in step S130 that the speed limit Vr is greater than or equal to the vehicle speed Vc if the vehicle carries out the lane change to the rear of the other vehicle under the condition where none of steps S120 and S140 is satisfied (NO), the vehicle speed control part 42 continues controlling the vehicle speed V using the temporary upper-limit speed Vw as the upper-limit (step S60). On the other hand, when the vehicle speed control part 42 determines in step S130 that the speed limit Vr is less than the vehicle speed Vc if the vehicle carries out the lane change to the rear of the other vehicle (YES), the vehicle speed control part 42 stops controlling the vehicle speed V using the temporary upper-limit speed Vw as the upper-limit, and controls the vehicle speed V to not exceed the upper-limit speed Vu (step S20).

In step S140, the vehicle speed control part 42 determines whether the vehicle speed V is decreased below the speed limit Vr after exceeding the speed limit Vr. When the vehicle speed control part 42 determines that the vehicle speed V is decreased below the speed limit Vr after exceeding the speed limit Vr, the vehicle speed control part 42 stops controlling the vehicle speed V using the temporary upper-limit speed Vw as the upper-limit, and controls the vehicle speed V to not exceed the upper-limit speed Vu (step S20).

Thus, the vehicle speed control apparatuses and the vehicle limiting apparatuses have been described in the embodiments. However, the present disclosure is not limited to these embodiments. Various modifications and/or improvements such as combinations with part or all of another embodiment(s), a replacement(s) with part of another embodiment(s), and so forth, can be made.

According to the present disclosure, even if the speed limit of a road is reduced when a vehicle carries out a lane change, the vehicle speed is not limited to the thus reduced speed limit, but is limited to the upper-limit speed that was determined before the start of the vehicle's lane change is estimated. Therefore, it is possible to reduce a likelihood of deceleration of the vehicle, which may otherwise occur against the driver's intention.

What is claimed is:
1. A vehicle speed control apparatus comprising:
at least one processor configured to
determine an upper-limit speed of a vehicle each time a speed limit of a road on which the vehicle is traveling changes; and
control a speed of the vehicle in such a manner as to not exceed the upper-limit speed even if the vehicle's accelerator pedal depression amount would cause the speed of the vehicle to exceed the upper-limit speed, wherein
the at least one processor is further configured to
determine an updated upper-limit speed of the vehicle for after the vehicle's lane change is completed,
control, for a predetermined amount of time, the speed of the vehicle to not exceed the upper-limit speed determined before detection of a start of the vehicle's lane change when (i) the start of the vehicle's lane change is determined, and (ii) a reduction in the speed limit is determined, where the reduction in the speed limit is from the speed limit determined before detection of the start of the vehicle's lane change to the speed limit for after the vehicle's lane change is completed, and
control, after the predetermined amount of time, the speed of the vehicle to not exceed the updated upper-limit speed.

2. The vehicle speed control apparatus as claimed in claim 1, wherein
the at least one processor is further configured to control, for the predetermined amount of time, the speed of the vehicle to not exceed the upper-limit speed determined before detection of the start of the vehicle's lane change when (iii) the start of the vehicle's lane change is determined, and (iv) it is determined that the speed limit after the vehicle's lane change is completed is less than a currently detected speed of the vehicle.

3. The vehicle speed control apparatus as claimed in claim 1, wherein
the at least one processor is further configured to control, for the predetermined amount of time, the speed of the vehicle to not exceed the upper-limit speed determined before detection of the start of the vehicle's lane change in front of another vehicle when (iii) the start of the vehicle's lane change in front of the other vehicle is determined, and (iv) the reduction in the speed limit is determined.

4. The vehicle speed control apparatus as claimed in claim 1, wherein
the at least one processor is further configured to control, for the predetermined amount of time, the speed of the vehicle to not exceed the upper-limit speed determined before a start of the vehicle's lane change in front of another vehicle is determined when (iii) the start of the vehicle's lane change in front of the other vehicle is determined, and (iv) the speed limit after the vehicle's lane change is completed is less than or equal to the current speed of the other vehicle.

5. A vehicle speed limiting apparatus comprising:
the vehicle speed control apparatus as claimed in claim 1, further comprising:
a depression amount detection sensor that detects the vehicle's accelerator pedal depression amount;
a speed limit determination part, implemented by the at least one processor that determines the speed limit of the road on which the vehicle is traveling; and
an estimation part, implemented by the at least one processor, that estimates the start of the vehicle's lane change.

6. The vehicle speed limiting apparatus as claimed in claim 5, further comprising:
a vehicle speed detection sensor that detects the speed of the vehicle, wherein
the at least one processor of the vehicle speed control apparatus is further configured to control, for the predetermined amount of time, the speed of the vehicle to not exceed the upper-limit speed determined before detection of a start of the vehicle's lane change when (iii) the estimation part determines that the start of the vehicle's lane change has begun, and (iv) the speed limit determination part determines that the speed limit after the vehicle's lane change is completed is less than the currently detected speed of the vehicle detected by the vehicle speed detection sensor.

7. The vehicle speed limiting apparatus as claimed in claim 5, wherein
the estimation part determines that the vehicle's lane change in front of another vehicle has begun, and the at least one processor of the vehicle speed control apparatus is further configured to control, for the predetermined amount of time, the speed of the vehicle to not exceed the upper-limit speed determined before the start of the vehicle's lane change in front of another vehicle when (iii) the estimation part determines the start of the vehicle's lane change in front of the other vehicle has begun, and (iv) the speed limit determination part determines that there is the reduction in the speed limit.

8. The vehicle speed limiting apparatus as claimed in claim 5, further comprising:

a vehicle speed measurement sensor that measures a speed of another vehicle, wherein the estimation part determines that the vehicle's lane change in front of the other vehicle has begun, and the at least one processor of the vehicle speed control apparatus is further configured to control, for the predetermined amount of time, the speed of the vehicle to not exceed the upper-limit speed determined before detection of the start of the vehicle's lane change in front of the other vehicle when (iii) the estimation part determines that the start of the vehicle's lane change in front of the other vehicle has begun, and (iv) the speed limit determination part determines that the speed limit after the vehicle's lane change is completed is less than or equal to the current speed of the other vehicle that is detected by the vehicle speed measurement sensor.

\* \* \* \* \*